United States Patent
Gates et al.

(10) Patent No.: US 12,525,316 B2
(45) Date of Patent: Jan. 13, 2026

(54) TRAY TABLE INDICATOR

(71) Applicant: UNITED AIRLINES, INC., Chicago, IL (US)

(72) Inventors: Matthew C. Gates, Chicago, IL (US); Brian Wood, Montgomery, TX (US); Mike Garcia, Orlando, FL (US); Alan Rosenberg, Orlando, FL (US); Chris Lynch, Orlando, FL (US)

(73) Assignee: UNITED AIRLINES, INC., Chicago, IL (US)

( * ) Notice: Subject to any disclaimer, the term of this patent is extended or adjusted under 35 U.S.C. 154(b) by 946 days.

(21) Appl. No.: 17/547,714

(22) Filed: Dec. 10, 2021

(65) Prior Publication Data
US 2023/0187015 A1    Jun. 15, 2023

(51) Int. Cl.
*G12B 3/00* (2006.01)
*B64D 11/06* (2006.01)

(52) U.S. Cl.
CPC ............ *G12B 3/00* (2013.01); *B64D 11/0638* (2014.12)

(58) Field of Classification Search
CPC ...... G12B 3/00; B64D 11/0638; B64D 45/00; B64D 2045/007; B64F 5/30; B60N 3/004
See application file for complete search history.

(56) References Cited

U.S. PATENT DOCUMENTS

| | | | | |
|---|---|---|---|---|
| 446,872 A | * | 2/1891 | Lightner | A63F 7/044 273/113 |
| 451,958 A | * | 5/1891 | Swett | A63F 7/044 273/113 |
| 508,245 A | * | 11/1893 | Robinson | A63F 7/044 273/113 |
| 576,212 A | * | 2/1897 | Matthews | A63F 7/044 273/113 |
| 585,801 A | * | 7/1897 | Vance | A63F 7/044 273/113 |
| 2,411,165 A | * | 11/1946 | Mcbride | G01C 9/10 235/61 J |
| 2,487,433 A | * | 11/1949 | Gardenhour | G04F 1/08 968/808 |

(Continued)

FOREIGN PATENT DOCUMENTS

WO    WO-2020/197567 A1    10/2020

OTHER PUBLICATIONS

International Application No. PCT/US2022/052102, International Search Report and Written Opinion, mailed Apr. 24, 2023.

*Primary Examiner* — Kristina M Deherrera
*Assistant Examiner* — Tania Courson
(74) *Attorney, Agent, or Firm* — MARSHALL, GERSTEIN & BORUN LLP

(57) ABSTRACT

A tray table indicator includes a channel, a cover, and a magnetic ball. The channel has a first extension, a curve, and a second extension, and the cover encloses the channel. A magnetic ball is contained within the channel and is movable from the first extension around the curve to the second extension of the channel in response to rotation of the rotating tray table component by a minimum distance in a first direction. The curve of the channel is configured to prevent gravity from returning the magnetic ball to the first extension from the second extension in response to rotation of the rotating tray table component in a second direction after having rotated the minimum distance in the first direction.

19 Claims, 6 Drawing Sheets

(56) References Cited

U.S. PATENT DOCUMENTS

| | | | | |
|---|---|---|---|---|
| 3,301,559 | A * | 1/1967 | Jolley | A63D 5/00 33/300 |
| 4,068,613 | A * | 1/1978 | Rubey | G01P 15/06 116/203 |
| RE32,570 | E * | 1/1988 | Conn | G01C 9/10 33/379 |
| 4,744,563 | A * | 5/1988 | Anastasia | A63F 7/38 273/DIG. 19 |
| 4,903,711 | A * | 2/1990 | Gunther | A61F 5/00 128/874 |
| 5,398,422 | A * | 3/1995 | Clarkson | A44B 15/005 70/456 R |
| 5,625,956 | A * | 5/1997 | Cone, II | G01C 9/10 33/365 |
| 6,182,310 | B1 * | 2/2001 | Weismiller | A61G 7/0508 5/424 |
| 6,281,456 | B1 * | 8/2001 | Ogden | H01H 35/025 33/366.11 |
| 6,732,440 | B2 * | 5/2004 | Mangerson | G01C 9/06 33/366.26 |
| 6,848,390 | B2 * | 2/2005 | Akers | G01K 5/483 374/E3.004 |
| 7,926,194 | B2 * | 4/2011 | Katoh | H01H 35/14 33/366.11 |
| 9,541,388 | B2 * | 1/2017 | Li | G01C 9/10 |
| 10,745,146 | B2 * | 8/2020 | Perez | B64D 45/00 |
| 2004/0195875 | A1 * | 10/2004 | Skelly | B60N 2/242 297/217.3 |
| 2006/0175750 | A1 * | 8/2006 | Ware | A63F 7/382 273/121 A |
| 2010/0315070 | A1 * | 12/2010 | Hong | G01C 9/12 33/365 |
| 2015/0158589 | A1 * | 6/2015 | Meckes | B64D 11/0638 29/559 |
| 2017/0283086 | A1 | 10/2017 | Garing et al. | |
| 2018/0265214 | A1 | 9/2018 | Perez | |

\* cited by examiner

TRAY TABLE INDICATOR

FIELD OF THE DISCLOSURE

The present disclosure relates to a tray table indicator for use in determining whether a tray table has been opened for use and therefore needs to be cleaned, particularly a tray table in use on a commercial passenger airplane.

BACKGROUND

On commercial passenger flights, the cabin tray table provides a surface on which to place food items, personal electronic devices, toys, books, and writing materials. Most, if not all, commercial passenger aircraft are equipped with tray tables. These tray tables are often located at each seat assembly behind the back rest and are accessible to the passenger immediately seated behind that seat assembly. The tray tables are required to be in a stowed position when the aircraft is taking off and again during the landing phase of flight in order to comply with FAA regulations. In the stowed position, all passengers seated in a row have unobstructed access to the seat aisle or their respective assigned seat. In the open position, each passenger has access to a tray table for personal convenience. Depending on the phase of flight, the cabin crew will indicate when tray tables may be utilized by the passengers.

When tray tables are used by passengers inflight, the tray tables may be soiled with food or drink items. Because all tray tables are stowed for landing, the cleaning crew responsible for cleaning the aircraft after the passengers disembark has no way to determine which tray table were used during the flight and which were not. As a result, all tray tables have to be cleaned when the aircraft lands, a process that involves opening and closing all of the tray tables on the aircraft, even those that were never opened and are still clean from a previous cleaning.

SUMMARY

The disclosed tray table indicator enables a cleaning crew to identify which tray tables were opened during a flight so that unopened tray tables are not unnecessarily cleaned. The tray table indicator includes a magnetic ball within an enclosed channel, and the ball moves from a first extension around a curve to a second extension of the channel when the tray table is opened. Gravity and the curve prevent the magnetic ball from returning to the first extension from the second extension during a counter-rotation to close the tray table, and thus the presence of the magnetic ball within the second extension indicates that the tray table has been opened. The tray table indicator is relatively tamper proof as most passengers do not have a magnet to move the magnetic ball, but can be easily reset by a cleaning crew using a magnetic device after cleaning of an opened tray is complete. The tray table indicator may be a separate device that can be secured on existing tray tables to retrofit them, or the tray table indicator may be built into new tray tables. The tray table indicator provides a reliable way to identify which tray tables need cleaning, saving cleaning crews the time of cleaning unopened tray tables and reducing the amount of cleaning supplies that need be dedicated to cleaning tray tables.

In accordance with a first aspect, a tray table indicator includes a body, a channel, a cover, and a magnetic ball. The body has a body depth between a first surface and a second surface, and the first surface of the body is securable to a rotating tray table component. The channel extends from the second surface into the body a portion of the body depth. The channel has a first extension, a curve, and a second extension. The cover is secured against the second surface of the body to enclose the channel. The magnetic ball is contained within the channel between the body and the cover. The magnetic ball is movable from the first extension around the curve to the second extension of the channel in response to rotation of the rotating tray table component by a minimum distance in a first direction. The curve of the channel is configured to prevent gravity from returning the magnetic ball to the first extension from the second extension in response to rotation of the rotating tray table component in a second direction after having rotated the minimum distance in the first direction.

In accordance with a second aspect, a rotating tray component has an integrated tray table indicator including a channel, a cover, and a magnetic ball. The channel extends from a tray surface into the rotating tray component a channel depth, the channel having a first extension, a curve, and a second extension. The cover is secured over the channel against the rotating tray component to enclose the channel. The magnetic ball is contained within the channel between the rotating tray component and the cover. The magnetic ball is movable from the first extension to the second extension of the channel in response to rotation of the rotating tray table component by a minimum distance in a first direction. The curve of the channel is configured to prevent gravity from returning the magnetic ball to the first extension from the second extension win response to rotation of the rotating tray table component in a second direction after having rotated the minimum distance in the first direction.

In accordance with a third aspect, a tray table indicator has a channel, a cover, a ball, and a first stop. The channel has a first extension, a curve, and a second extension that together form a first pathway. The channel further has a return pathway between the second extension and the first extension that is distinct from the first pathway. The cover is secured over the channel to enclose the channel. The ball is contained within the channel. The ball is movable from the first extension to the second extension of the channel in response to rotation of a rotating tray table component by a minimum distance in a first direction. The curve of the channel is configured to prevent gravity from returning the magnetic ball to the first extension from the second extension in response to rotation of the rotating tray table component in a second direction after having rotated the minimum distance in the first direction. The first stop is biased to prevent the ball from entering the return pathway unless an external force acts on the first stop. In some forms, the channel may further include a second stop located within the return pathway, the second stop being a one-way passageway.

In accordance with a fourth aspect, a tray table indicator includes a channel, a cover, and a magnetic ball. The channel is secured to or integral with a rotating tray table component. The channel has a first end and a second end. A magnetic catch is provided within the channel at the second end. The cover is secured over the channel to enclose the channel. The magnetic ball is contained within the channel. The magnetic ball is movable from the first end to the second end in response to rotation of the rotating tray table component by a minimum distance in a first direction. The magnetic catch has a strength sufficient to prevent gravity from returning the magnetic ball to the first end from the second end in response to rotation of the rotating tray table component in a second direction after having rotated the minimum distance in the first direction.

In some forms, the cover may be transparent to allow visual assessment of a location of the magnetic ball within the channel to determine whether the rotating tray table component rotated the minimum distance. In other forms, an area of the cover may be opaque, and the cover may include a transparent window covering at least a portion of the second extension of the channel to visually indicate by a presence or absence of the magnetic ball within the second extension whether the rotating tray table component rotated the minimum distance in the first direction.

In additional forms, a length of the first extension may be greater than a length of the second extension, and the first extension and the second extension may be substantially parallel.

In further forms, the body may include a top edge configured for placement along an edge of the rotating tray table component, and the first extension of the channel may be positioned at an angle relative to the top edge of the body. The angle of the first extension relative to the top edge may be between 2 and 10 degrees.

In other forms, the tray surface may include a top edge, and the first extension of the channel may be positioned at an angle relative to the top edge. The angle of the first extension relative to the top edge may be between 2 and 10 degrees.

In some forms, the curve or the second extension of the channel may include a trigger that, when contacted by the magnetic ball, activates a secondary visual indicator.

In some forms, the tray table indicator may further include a securement mount, and the securement mount may include a surface secured adjacent the rotating tray table component. The first surface of the body may be removably securable within the securement mount. In other forms, adhesive may be provided on the first surface of the body to directly secure the body to the rotating tray component.

In some forms, the tray table indicator may further include a processor and a signal emitter. The processor may be configured to emit a signal receivable by a network when a trigger of the channel is contacted by the magnetic ball. In additional forms, the tray table indicator may further include an RFID reader configured to obtain digital data from an RFID tag, and the processor may be configured to transmit the digital data to the network

BRIEF DESCRIPTION OF THE DRAWINGS

The figures described herein depict various aspects of the system and methods disclosed herein. It should be understood that each figure depicts an example of aspects of the present systems and methods.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
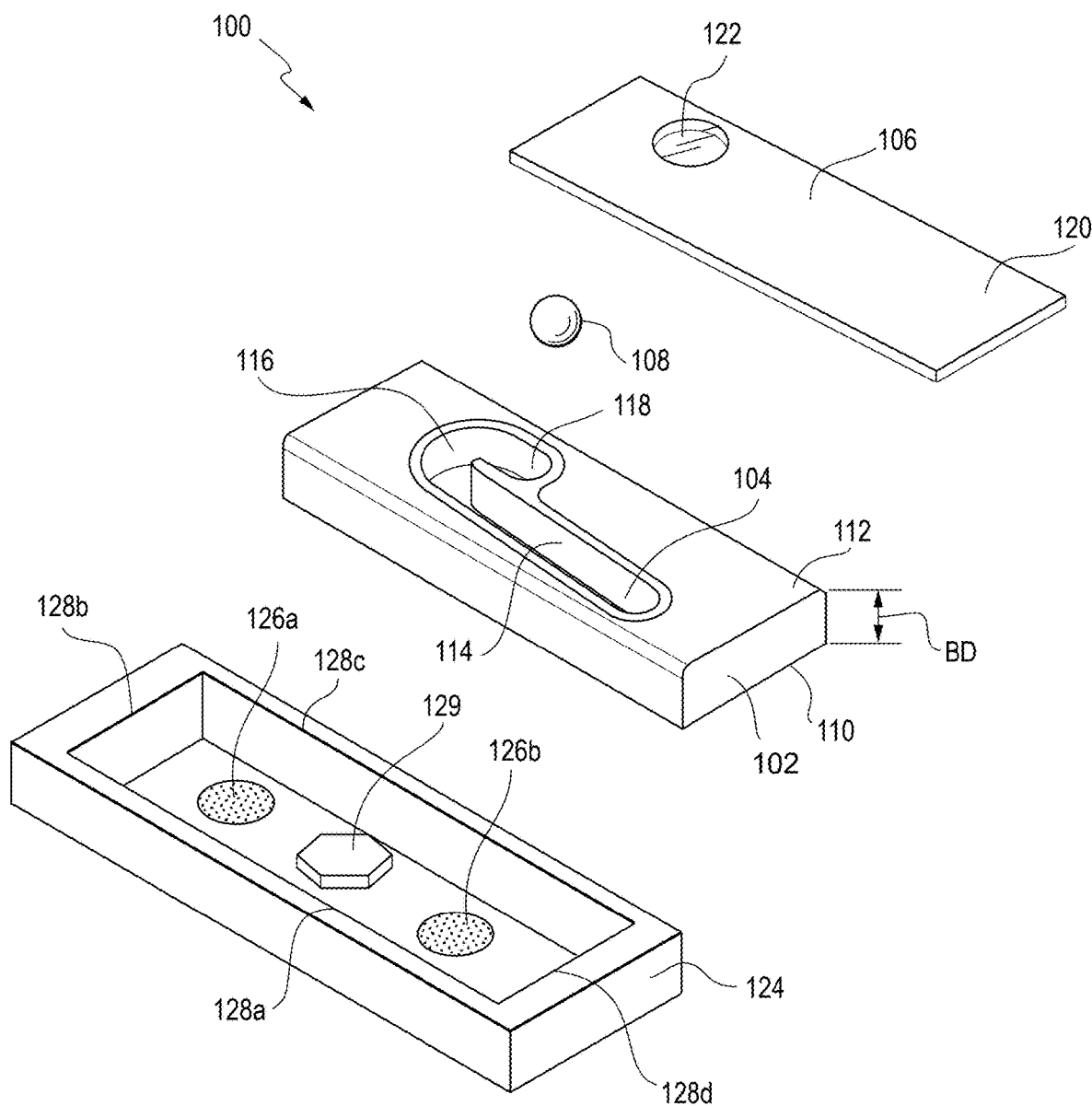
FIG. 1 is an exploded view of a tray table indicator having a body and a securement mount.

In FIG. 1, a tray table indicator 100 includes a body 102, a channel 104, a cover 106, and a magnetic ball 108. The body 102 has a body depth BD between a first surface 110 and a second surface 112. The first surface 110 of the body is positioned within a vertical plane aligned with a side of a a rotating tray table component 111 (not depicted, shown in FIG. 2 as rotating tray table component 211) and secured to the rotating tray table component 111. Returning to FIG. 1, the channel 104 extends from the second surface 112 into the body 102 a portion of the body depth BD. The channel 104 has a first extension 114, a curve 116, and a second extension 118. The cover 106 is configured to be secured against the second surface 112 of the body 102. The magnetic ball 108 is contained within the channel 104 between the body 102 and the cover 106.

The magnetic ball 108 is movable from the first extension 114 around the curve 116 to the second extension 118 of the channel 104 in response to rotation of the rotating tray table component 111 around an axis intersecting the vertical plane aligned with its side by a minimum distance in a first direction. The minimum distance may correspond with the rotating tray table component 111 being opened or substantially opened by a passenger for use as a surface on which to place personal items. The curve 116 of the channel 104 is configured to prevent gravity from returning the magnetic ball 108 to the first extension 114 from the second extension 118 in response to rotation of the rotating tray table component 111 in a second direction after having rotated the minimum distance in the first direction. The second direction may correspond with the direction that the rotating tray table component 111 is moved in order to close or stow the rotating tray table component 111. The result is that the presence of the magnetic ball 108 within the second extension 118 of the channel 104 may indicate that the tray was opened or substantially opened for use and should therefore be cleaned.

In some arrangements, the cover 106 is transparent to allow visual assessment of a location of the magnetic ball 108 within the channel 104 to determine whether the rotating tray table component 111 rotated the minimum distance (e.g., whether the tray has been opened). A cover 106 that is fully transparent allows a visual determination of whether the magnetic ball 108 is in the first extension 114 or the second extension 118. A fully transparent cover 106 allows a visual determination of whether the rotating tray table component 111 rotated the minimum distance in four ways: (1) the presence of the magnetic ball 108 in the first extension 114 indicates that the rotating tray table component 111 did not rotate the minimum distance (e.g., remained stowed); (2) the absence of the magnetic ball 108 in the first extension 114 indicates that the rotating tray table component 111 did rotate the minimum distance (e.g., was opened); (3) the presence of the magnetic ball 108 in the second extension 118 indicates that the rotating tray table component 111 did rotate the minimum distance (e.g., was opened); and (4) the absence of the presence of the magnetic ball 108 in the second extension 118 indicates that the rotating tray table component 111 did not rotate the minimum distance (e.g., remained stowed). A fully transparent cover 106 also has the benefit of allowing visual confirmation that the magnetic ball 108 did not somehow get stuck in the channel 104 if, for instance, the tray table indicator 100 was broken or dented during the flight.

However, in other arrangements, an area 120 of the cover 106 may be opaque, and the cover 106 may include a transparent window 122. The transparent window 122 may cover at least a portion of the second extension 118 of the channel 104 to visually indicate by a presence or absence of the magnetic ball within the second extension 118 whether the rotating tray table component 111 rotated the minimum distance in the first direction (e.g., was opened). The combination of the opaque area 120 and the transparent window 122 simplifies the visual determination, directing a viewer's eyes to the relevant area of the second extension 118 and making the determination binary. If the magnetic ball 108 is visible through the transparent window 122, the rotating tray table component 111 did rotate the minimum distance (e.g., was opened). If the magnetic ball 108 is not visible through the transparent window 122, the rotating tray table component 111 did not rotate the minimum distance (e.g., remained stowed).

FIG. 1 further discloses a securement mount 124, an intermediary component between the tray table indicator 100 and the rotating tray table component 111 that connects the tray table indicator 100 to the rotating tray table component 111. In some arrangements, a securement mount 124 is not necessary. Adhesive or another fastening mechanism may simply be provided on the first surface 110 of the tray table indicator 100. The tray table indicator 100 may then be adhered or fastened (such as by a screw or other typical fastener) directly to the rotating tray table component 111 directly. However, some adhesives and/or fastening mechanisms prevent the tray table indicator 100 from being easily removable. On occasion, removal of the tray table indicator 100 may be beneficial to clean or replace the tray table indicator 100. To that end, a securement mount 124 may be permanently or semi-permanently attached to the rotating tray table component 111, and the securement mount 124 can then connect in a removable way to the tray table indicator 100. For instance, the securement mount 124 shown in FIG. 1 includes two apertures 126a and 126b through which a screw can be inserted to attach the securement mount 124 to a rotating tray table component 111. The securement mount 124 further includes sides 128a, 128b, 128c, and 128d to secure the tray table indicator 100 within the securement mount 124, and may optionally further include a hook 129 or other engagement mechanism to releasably secure the first surface 110 of the tray table indicator 100 within the securement mount 124. In other arrangements not depicted herein, fewer or more sides 128 may be included, and other engagement mechanisms known in the art may be used to secure the first surface 110 of the tray table indicator 100 within the securement mount 124.

Figure 2:
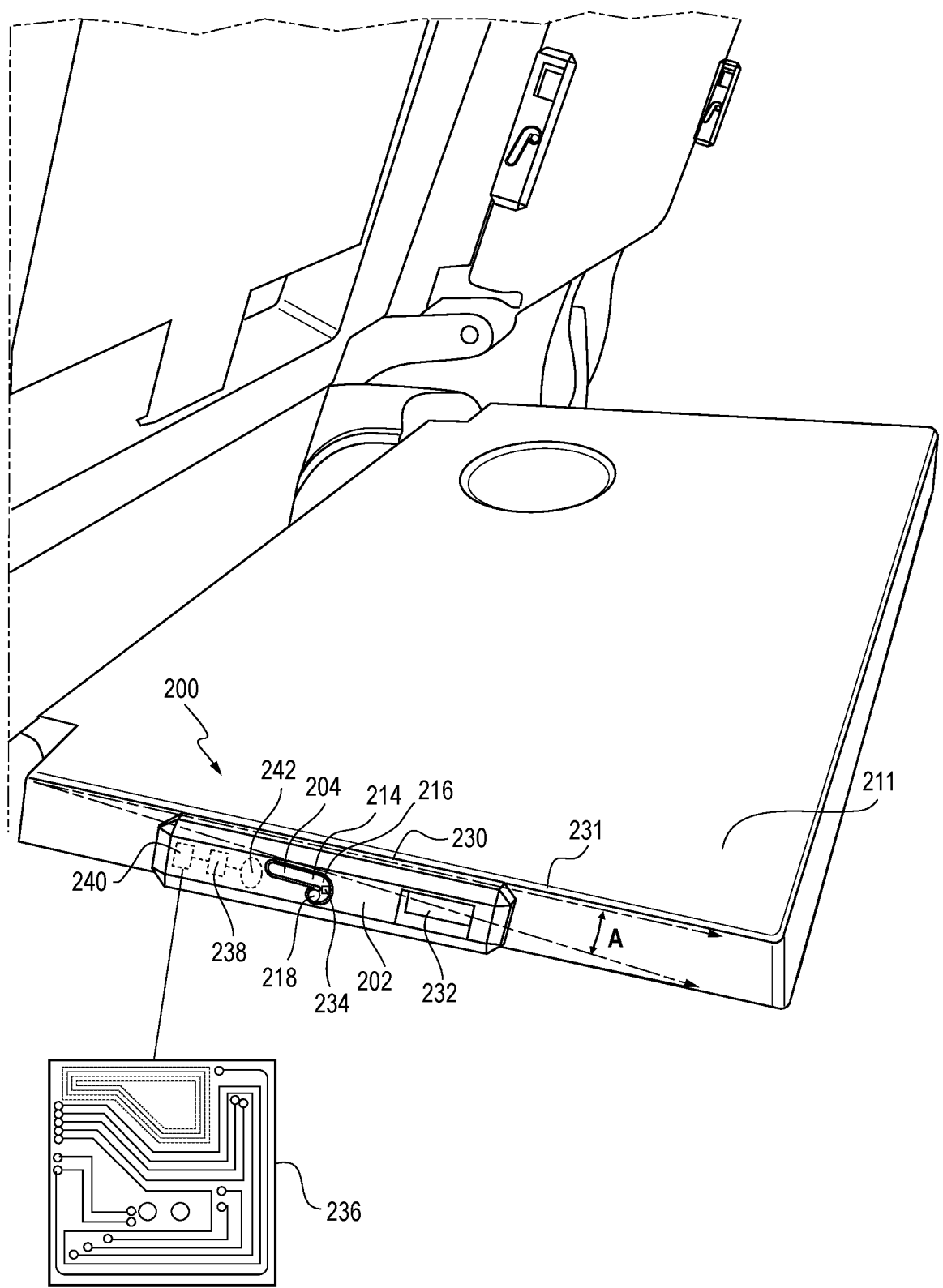
FIG. 2 is an isometric side view of a plurality of tray table indicators that have been used to retrofit rotating tray table components.

Turning now to FIG. 2, an alternative arrangement of a tray table indicator 200 is shown. It will be appreciated that the tray table indicator 200 illustrated in FIG. 2 may include similar features to the tray table indicator 100, and thereby elements illustrated in FIG. 2 are designated by similar reference numbers indicated on the arrangement illustrated in FIG. 1, increased by 100. Accordingly, these features will not be described in substantial detail. Further, it is appreciated that any combination or sub-combination of features described in regard to the tray table indicator 100 may be incorporated into the tray table adapter 200, and vice-versa.

As shown, the tray table indicator 200 has a body 202 that includes a top edge 230 that is configured for placement along an edge 232 of the rotating tray table component 211. The rotating tray table component 211 in FIG. 2 is the tray itself providing the surface for the placement of personal items. However, in other arrangements not herein depicted, the rotating tray table component 211 may be another rotating tray table component such as a latch or a connection bracket.

The first extension 214 of the channel 204 is positioned at an angle A relative to the top edge 230 of the body 202. The angle A ensures that the magnetic ball 208 rolls from the first extension 214 of the channel 204 around the curve 216 and to the second extension 218 when the rotating tray table component 211 is rotated the minimum distance. In some instances, the minimum distance is the full rotation needed for the rotating tray table component 211 to move from a vertical orientation to a horizontal orientation. In other instances, the minimum distance may be less than the full rotation needed for the rotating tray table component 211 to move from the vertical orientation to the horizontal orientation. For example, the rotating tray table component 211 may not be able to rotate to a fully horizontal orientation due to a placement of a passenger's knees in a certain position. Nonetheless, the tray table indicator 200 should be configured to indicate that the rotating tray table component 211 was substantially opened. To that end, the angle A relative to the top edge 230 of the body 202 may be between 2 and 10 degrees. The angle A may be more than 10 degrees relative to the top edge 230 if the body 202 of the tray table indicator 200 has sufficient space to accommodate the channel 204 at that particular angle A.

As shown in FIG. 2, the tray table indicator 200 further includes a secondary visual indicator 232. The secondary visual indicator 232 may be an LED light, a mechanical component that changes color, a text display, or any other indicator that facilitates determining visually that a rotating tray table component 211 has rotated the minimum distance. A trigger 234 causes the secondary visual indicator 232 to change from a first state (e.g., the LED light being off, a first color showing, no text on a display) to a second state (e.g., the LED light being on, a second color showing, text on a display). The trigger 234 may be a mechanical trigger located within the curve 216 or the second extension 218 of the channel 204 that is activated when the magnetic ball 208 passes over it. Alternately, the trigger 234 may be a more complex sensor, such as a gravity sensor or an accelerometer, that causes the change from the first state to the second state when the rotating tray component is rotated the minimum distance.

As shown schematically in FIG. 2, the tray table indicator 200 may be in communication with a network 236, such as an on-board computer network, that keeps track of the status of each tray table indicator 200 on the aircraft. In particular, the tray table indicator 200 may include a processor 238 and a signal emitter 240 (both shown schematically). The processor 238 may be configured to emit a signal via the signal emitter 240 that is received by the network when the trigger 234 is activated. For example, the trigger 234 may be mechanically activated when the magnetic ball 208 passes by, the trigger 234 may communicate its activation to the processor 238, and the processor 238 may cause the signal emitter 240 to send a signal to the network 236 indicating that the rotating tray table component 211 at that particular seat number was opened. At the end of the flight, the cleaning crew may review the data within the network 236 to determine which trays need to be cleaned.

Further, as shown in FIG. 2, the tray table indicator 200 may include an RFID reader 242 (shown schematically). The magnet used by a cleaning crew member to reset the magnetic ball 208 within the channel 204 may further include an RFID tag, or the cleaning crew member may have a separate structure with an RFID tag, that is read by the RFID reader 242 in order to indicate to the reader who was responsible for cleaning the tray table component 211 (e.g., which RFID tag has been read by the RFID reader 242). The RFID reader 242 is in communication with the processor 238, which directs the signal emitter 240 to send a signal to the network 236 to track this information. In this way, the network 236 can provide data to confirm that a thorough cleaning process is completed and can identify the cleaning crew member responsible for any oversights.

Figure 3:
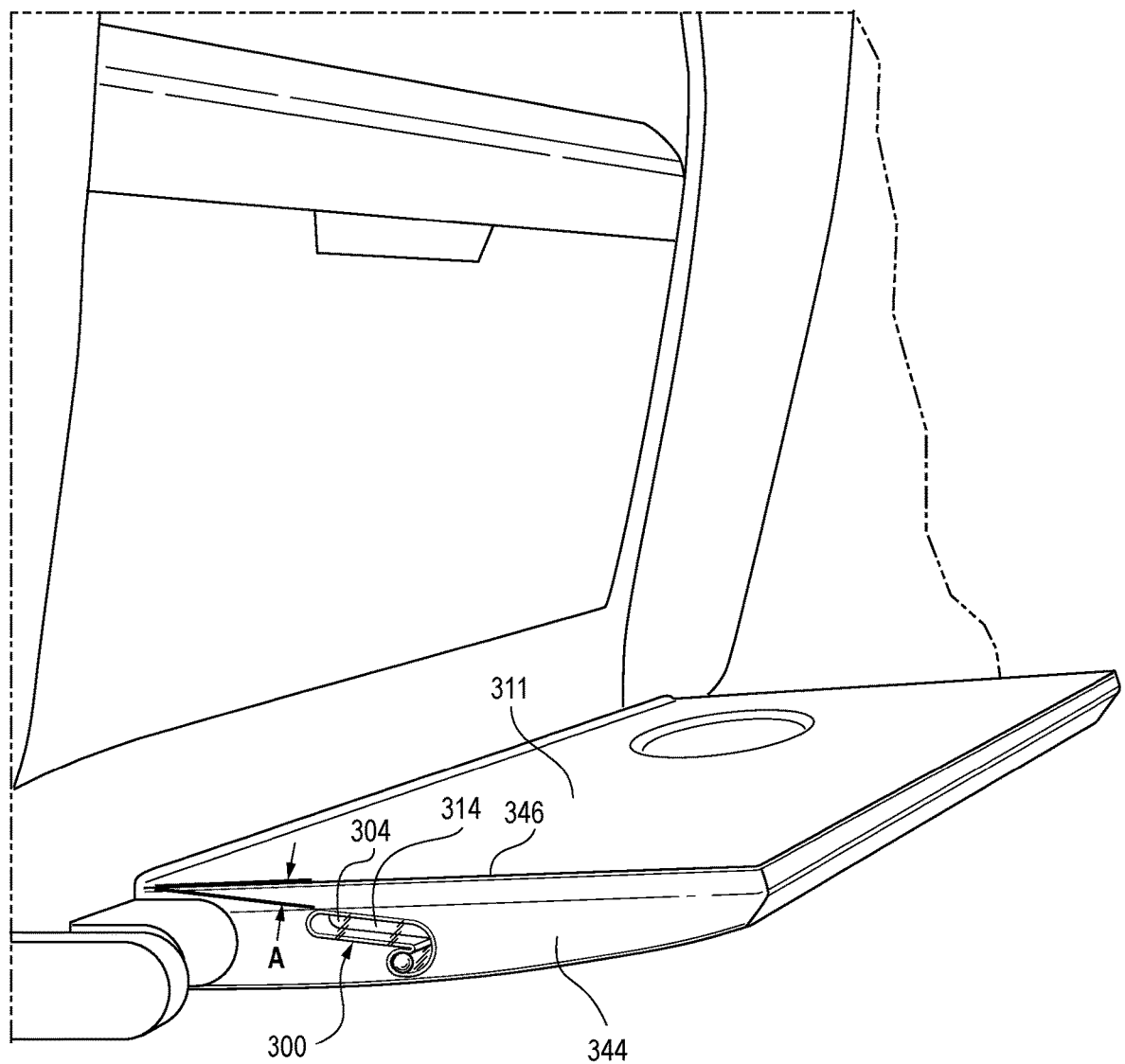
FIG. 3 is an isometric side view of a tray table indicator that is integral with a rotating tray table component.

Turning to FIG. 3, the shown tray table indicator 300 is integral with the rotating tray table component 311. It will be appreciated that the tray table indicator 300 illustrated in FIG. 3 may include similar features to the tray table indicators 100 and 200, and thereby elements illustrated in FIG. 3 are designated by similar reference numbers indicated on the arrangements illustrated in FIGS. 1 and 2, increased by a multiple of 100. Accordingly, these features will not be described in substantial detail. Further, it is appreciated that any combination or sub-combination of features described in regard to the tray table indicator 100 may be incorporated into the tray table adapter 200, and vice-versa.

In the integrated tray table indicator 300, the channel 304 extends from a tray surface 344 of the rotating tray component 311 into the rotating tray component 311. The cover 306 is secured over the channel 304 against the rotating tray component 311 to enclose the channel 304. The tray surface 344 includes a top edge 346, and the first extension 314 of the channel 304 is positioned at an angle relative to the top edge 346 to ensure the same efficacy of the tray table indicator 300 discussed above with respect to tray table indicator 200. The angle A of the first extension 314 relative to the top edge 346 may be between 2 and 10 degrees, or greater than 10 degrees if space on the rotating tray component 311 allows. The benefit of an integrated tray table indicator 300 is that the tray table indicator 300 can be flush or substantially flush with the rotating tray component 311 and is thus less likely to be tampered with by passengers. Further, the tray table indicator 300 cannot fall off. The downside is that the rotating tray component 311 must be manufactured or undergo off-site post-manufacture revisions in order to include an integrated tray table indicator 300, whereas the tray table indicators 100 and 200 allow retrofitting to occur on the aircraft.

Figure 4A:
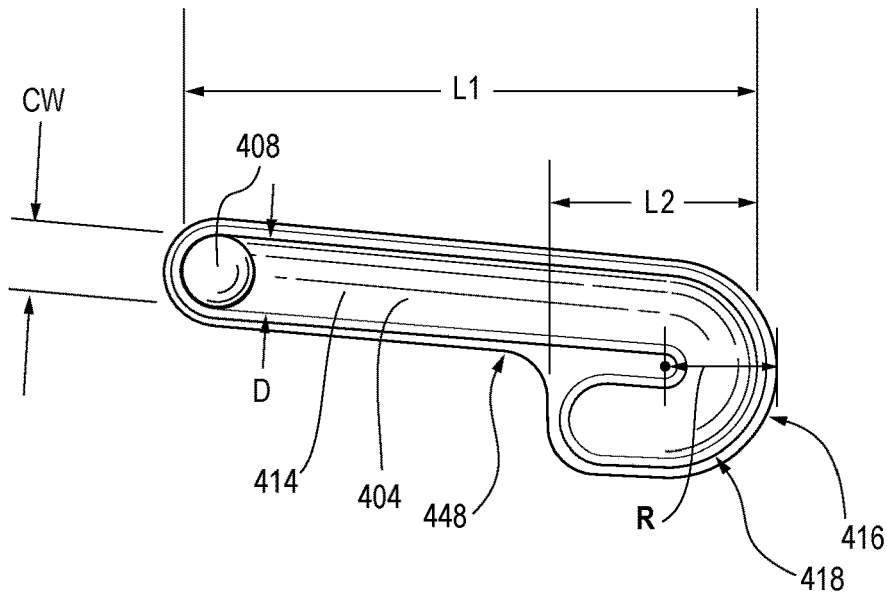
FIG. 4A is a top view of a channel of a tray table indicator showing dimensions.
Figure 4B:
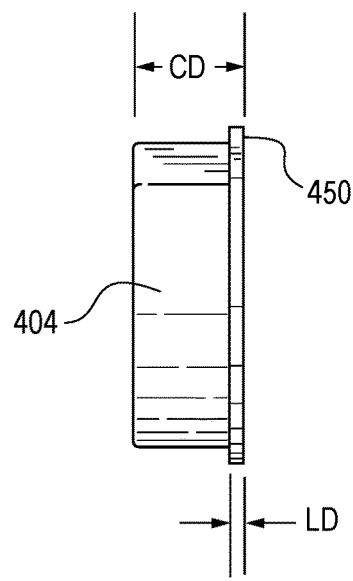
FIG. 4B is a side view of a channel of a tray table indicator showing dimensions.

FIGS. 4A and 4B illustrate the dimensions of a channel 404. It will be appreciated that the channel 404 illustrated in FIGS. 4A and 4B may include similar features to the channels 104, 204, and 304, and thereby elements illustrated in FIGS. 4A and 4B are designated by similar reference numbers indicated on the arrangements listed in FIGS. 1-3, increased by a multiple of 100. Accordingly, these features will not be described in substantial detail. Further, it is appreciated that any combination or sub-combination of features described in regard to channel 404 may be incorporated into the channels 104, 204, and 304, and vice-versa.

As shown in FIG. 4A, the channel 404 is sized in some arrangements to accommodate a magnetic ball 408 that has a $5/32$ inch or $3/16$ inch diameter D. The channel 404 has a channel length CL. The channel length CL is between 0.75 inch and 1.6 inches, preferably between 1 inch and 1.375 inches. The channel width CW is between 0.1763 and 0.2163 inch, preferably 0.1963 for a magnetic ball 408 that has a $5/32$ inch diameter. The channel width CW is consistent throughout the first extension 414, curve 416, and second extension 418. The curve 416 has a radius R between 0.0338 and 0.0538, preferably 0.0438 for a magnetic ball 408 that has a $5/32$ inch diameter. The channel 404 may include a fillet 448 between the first extension 414 and the second extension 418 to provide surface area for adhesive to secure the channel 404 in place in a body (such as body 102 or 202) or in a rotating tray table component (such as rotating tray table 311).

As shown in FIG. 4B, the channel 404 has a channel depth CD that is between 0.1520 and 0.2120 inch deep, preferably 0.1820 inch deep for a magnetic ball 408 that has a $5/32$ inch diameter. The channel 404 may include a lip 450 that has a lip depth LD that is between 0.0100 and 0.0300 inch deep, preferably 0.0200 for a magnetic ball 408 that has a $5/32$ inch diameter. The lip 450 allows adhesive to be used to secure the channel 404 in place in a body (such as body 102 or 202) or in a rotating tray table component (such as rotating tray table 311).

In addition, the first extension 414 has a length L1 and the second extension has a length L2. In the arrangement shown, the first extension 414 is longer than the second extension 418, resulting in a J-shape. However, in other arrangements, the first extension 414 may have a length L1 that is less than or equal to the length L2 of the second extension 418. In the arrangement shown, the first extension 414 and the second extension 418 are substantially parallel. However, in other arrangements, the first extension 414 and the second extension 418 may be disposed at an angle relative to one another.

Figure 5A:
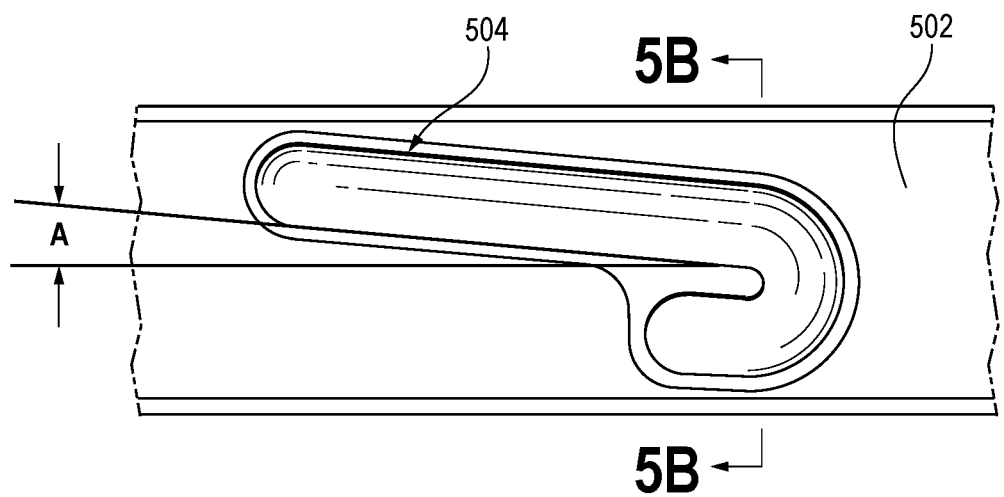
FIG. 5A is a top view of a body of a tray table indicator showing dimensions.
Figure 5B:
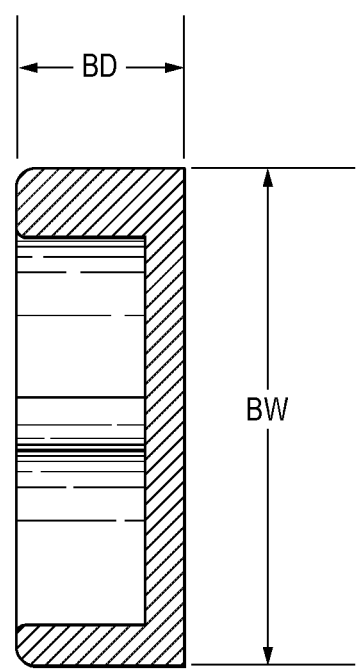
FIG. 5B is a side view of a body of a tray table indicator showing dimensions.

FIGS. 5A and 5B illustrate the dimensions of a body 502. It will be appreciated that the body 502 illustrated in FIGS. 5A and 5B may include similar features to the bodies 102 and 202, and thereby elements illustrated in FIGS. 4A and 5B are designated by similar reference numbers indicated on the arrangements listed in FIGS. 1-3, increased by a multiple of 100. Accordingly, these features will not be described in substantial detail. Further, it is appreciated that any combination or sub-combination of features described in regard to body 502 may be incorporated into the bodies 102 and 202, and vice-versa.

As discussed above and shown in FIG. 5A, the channel 504 is disposed at an angle A in the body 502, and the angle A is preferably between 2 degrees and 10 degrees. The body 502 in FIG. 5B has a body depth BD that is between 0.1530 and 0.2130 inch, preferably 0.1830 inch deep for a magnetic ball 408 that has a $5/32$ inch diameter. The body 502 has a body width BW that is at least 0.6200 inch wide, and is preferably at least 0.7200 inch wide for a magnetic ball 408 that has a 5/32 inch diameter.

Figure 6:
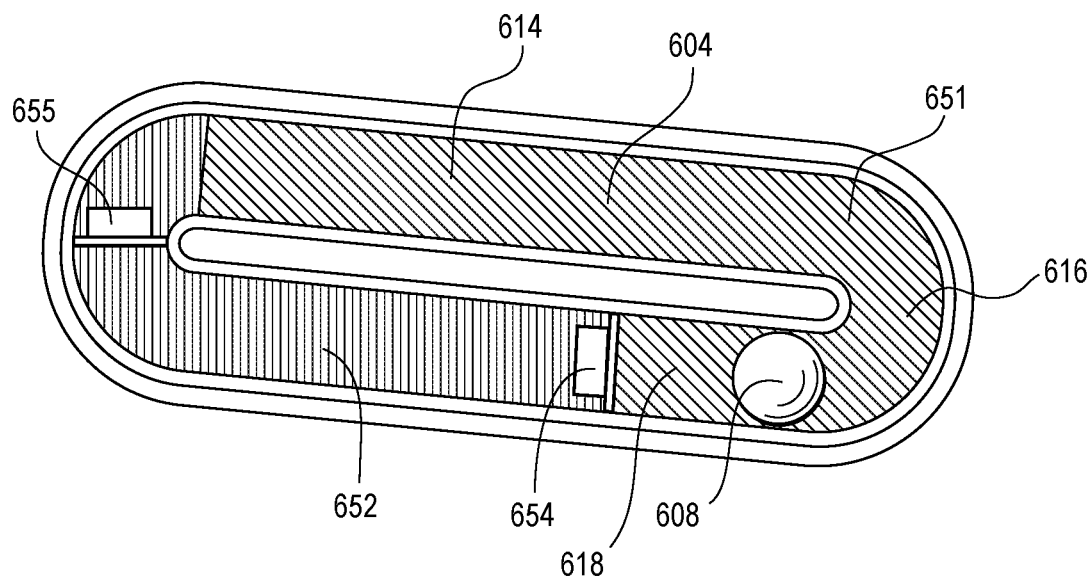
FIG. 6 is a top view of an alternative channel arrangement including a first stop.

FIG. 6 is a top view of an alternative channel 604 including a return pathway 652, a first stop 654, and a second stop 655. It will be appreciated that the channel 604 illustrated in FIG. 6 may include similar features to the channels 102, 202, 302, and 402, and thereby elements illustrated in FIGS. 1-4B are designated by similar reference numbers indicated on the arrangements listed in FIGS. 1-4B, increased by a multiple of 100. Accordingly, these features will not be described in substantial detail. Further, it is appreciated that any combination or sub-combination of features described in regard to channel 604 may be incorporated into the channels 102, 202, 302, and 402, and vice-versa.

As shown in FIG. 6, the first channel 614, the curve 616, and the second channel 618 together form a first pathway 651 (shown in a first shade). The channel 604 has a return pathway 652 (shown in a second shade) that connects the second extension 618 to the first extension 614 and is distinct from the first pathway 651. The return pathway 652 may include a curvature to allow the ball 608 to return to the position in which it started in the first extension 614. The first stop 654 is configured to prevent the ball from returning to the starting position unless and until an outside force (such as the magnet) acts on the first stop 654. In this way, the ball 608 is kept in a different location that allows a visual determination on whether cleaning needs to occur or not. The first stop 654 may be a magnetically activated first stop that, for example, retracts toward a magnet to allow a ball to pass. This type of first stop 654 is tamper resistant but may be easier for a cleaning crew member to activate, with gravity than returning the ball 508 to a starting position, than for the cleaning crew member to drag the ball 508 along a reverse pathway on the channel 604. The second stop 655 is a one-way passageway within the second pathway 652. When a rotating tray component (such as rotating tray component 311) is returned to a stowed position, the ball 608 passes through the second stop 655, which subsequently prevents the ball 608 from moving the opposite way through the second stop 655. The second stop 655 may be a simple mechanical device, such as a hinged flap with a one-way hinge, that is opened by the force of the moving ball 608. In some arrangements including a first stop 654 and a second stop 655, the ball 608 does not need to be magnetic. In some arrangements, the first stop 654 may not be magnetically activated but may be mechanically activated by a button or other triggering mechanism. Preferably, the button is placed or configured to not be easily activated by a passenger.

Figure 7:
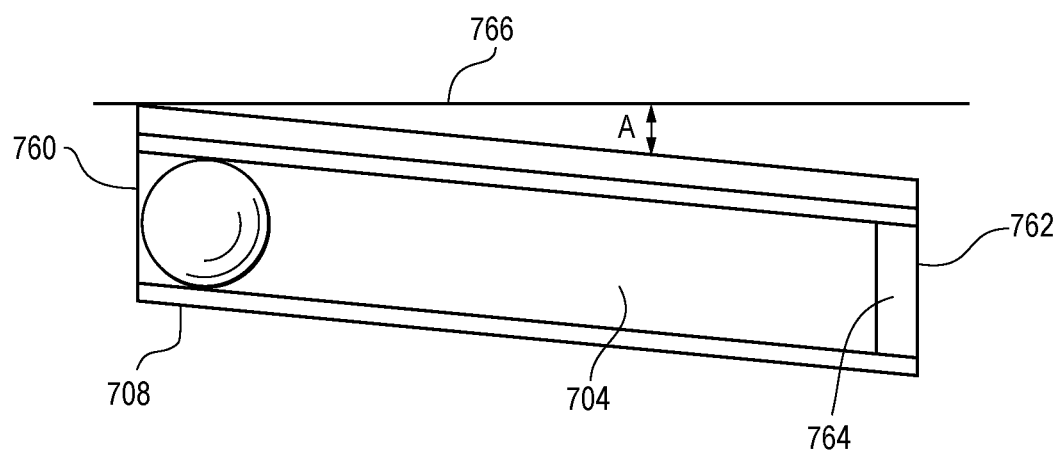
FIG. 7 is a top view of an alternative channel arrangement including a second end with a magnetic catch.

FIG. 7 is a top view of an alternative channel 704 including a first end 760, a second end 762, and a magnetic catch 764. It will be appreciated that the channel 704 illustrated in FIG. 7 may include similar features to the channels 102, 202, 302, 402, and 602 and thereby elements illustrated in FIGS. 1-4B and 6 are designated by similar reference numbers indicated on the arrangements listed in FIGS. 1-4B and 6, increased by a multiple of 100. Accordingly, these features will not be described in substantial detail. Further, it is appreciated that any combination or sub-combination of features described in regard to channel 704 may be incorporated into the channels 102, 202, 302, 402, and 602 and vice-versa.

As shown in FIG. 7, the channel 704 includes a first end 760 and a second end 762. The channel 704 may be secured to a rotating tray table component (for example, may be located in a body such as body 102 and then secured to a rotating tray table component such as rotating tray table component 111). Alternately, the channel 704 may be integral with a rotating tray table component (for example, may be similar to channel 304 that extends from tray surface 344 into the rotating tray component 311). In the arrangement shown in FIG. 7, the channel 704 is substantially straight and is disposed at an angle A relative to a top edge 766 that corresponds to either the top edge 230 of the body 202 or the top edge 346 of the tray surface 344, depending on whether the channel 704 is secured to or integral with a rotating tray table component. A cover, such as cover 106, covers the channel 704, and magnetic ball 708 is contained within the channel 704.

The magnetic ball 708 is movable from the first end 760 to the second end 762 in response to rotation of the rotating tray table component by a minimum distance in a first direction. At the second end 762, a magnetic catch 764 disposed against the second end 762 secures the ball 708. The magnetic catch 764 is strong enough to prevent gravity from returning the magnetic ball 708 to the first end 760 from the second end 762 in response to rotation of the rotating tray table component in a second direction after having rotated the minimum distance in the first direction. That is, the magnetic force of the magnetic catch 764 is sufficient to keep the ball 708 in place when the rotating tray table component is returned to an initial position. A magnet stronger than the magnetic catch 764 can later be used by, for example, a cleaning crew to release the ball 708 from the magnetic catch 764 to return it to the first end 760 after, for example, the rotating tray table component is cleaned.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A tray table indicator, the tray table indicator comprising
    a body having a body depth between a first surface and a second surface, the first surface of the body positioned within a vertical plane;
    a channel extending from the second surface into the body a portion of the body depth, the channel having a first extension, a curve, and a second extension, the channel having a channel width that is consistent throughout the first extension, the curve, and the second extension;
    a cover secured against the second surface of the body to enclose the channel; and
    a magnetic ball contained within the channel between the body and the cover, the magnetic ball having a diameter sized relative to the channel width such that the channel width limits movement of the ball to a single route within the channel,
    the magnetic ball being movable from the first extension around the curve to the second extension of the channel in response to rotation around an axis intersecting the vertical plane a minimum distance in a first direction, and
    the curve of the channel is configured to prevent gravity from returning the magnetic ball to the first extension from the second extension in response to rotation in a second direction around the axis intersecting the vertical plane after having rotated the minimum distance in the first direction,
    wherein the vertical plane is aligned with a side of a rotating tray table component to which the tray table indicator is secured and the axis intersecting the vertical plane is the axis around which the rotating tray table component rotates during use.

2. The tray table indicator of claim 1, the cover being transparent to allow visual assessment of a location of the magnetic ball within the channel to determine whether the rotation around the axis intersecting the vertical plane reached the minimum distance.

3. The tray table indicator of claim 1, an area of the cover being opaque, the cover including a transparent window covering at least a portion of the second extension of the channel to visually indicate by a presence or absence of the magnetic ball within the second extension whether rotation around the axis intersecting the vertical plane reached the minimum distance in the first direction.

4. The tray table indicator of claim 1, a length of the first extension being greater than a length of the second extension, and the first extension and the second extension being substantially parallel.

5. The tray table indicator of claim 1 further comprising a securement mount, the securement mount including a surface secured adjacent the rotating tray table component, the first surface of the body removably securable within the securement mount.

6. The tray table indicator of claim 1, the body comprising a top edge, and the first extension disposed at an angle between 2 degrees and 10 degrees in the body relative to the top edge.

7. The tray table indicator of claim 1, the channel including a fillet between the first extension and the second extension.

8. The tray table indicator of claim 1, the curve extending only between the first extension and the second extension.

9. The tray table indicator of claim 8, a length of the first extension being greater than a length of the second extension, and the first extension and the second extension being substantially parallel, such that the channel has a J-shape.

10. A tray table indicator, the tray table indicator comprising
    a body having a body depth between a first surface and a second surface, the first surface of the body positioned within a vertical plane;
    a channel extending from the second surface into the body a portion of the body depth, the channel having a first extension, a curve, and a second extension, the channel having a channel depth that is consistent in the first extension, the curve, and the second extension;
    a cover secured against the second surface of the body to enclose the channel; and
    a magnetic ball contained within the channel between the body and the cover, the magnetic ball being movable from the first extension around the curve to the second extension of the channel in response to rotation around an axis intersecting the vertical plane by a minimum distance in a first direction, and
    the curve of the channel is configured to prevent gravity from returning the magnetic ball to the first extension from the second extension in response to rotation around the axis intersecting the vertical plane in a second direction after having rotated the minimum distance in the first direction,
    wherein the vertical plane is aligned with a side of a rotating tray table component to which the tray table indicator is secured and the axis intersecting the vertical plane is the axis around which the rotating tray table component rotates during use.

11. The tray table indicator of claim 10, the body comprising a top edge, and the channel disposed at an angle between 2 degrees and 10 degrees in the body relative to the top edge.

12. The tray table indicator of claim 10, the channel including a fillet between the first extension and the second.

13. The tray table indicator of claim 10, the curve extending only between the first extension and the second extension.

14. The tray table indicator of claim 13, a length of the first extension being greater than a length of the second extension, and the first extension and the second extension being substantially parallel, such that the channel has a J-shape.

15. A tray table indicator, the tray table indicator comprising
- a body having a body depth between a first surface and a second surface, the first surface of the body positioned within a vertical plane;
- a channel extending from the second surface into the body a portion of the body depth, the channel having a first extension, a curve, and a second extension;
- a cover secured against the second surface of the body to enclose the channel; and
- a magnetic ball contained within the channel between the body and the cover, the magnetic ball being movable from the first extension around the curve to the second extension of the channel in response to rotation around an axis intersecting the vertical plane by a minimum distance in a first direction, and
- the curve of the channel is configured to prevent gravity from returning the magnetic ball to the first extension from the second extension in response to rotation around the axis intersecting the vertical plane in a second direction after having rotated the minimum distance in the first direction, and
- the magnetic ball comprises a magnetic material,
- wherein the vertical plane is aligned with a side of a rotating tray table component to which the tray table indicator is secured and the axis intersecting the vertical plane is the axis around which the rotating tray table component rotates during use.

16. The tray table indicator of claim 15, the body comprising a top edge, and the channel disposed at an angle between 2 degrees and 10 degrees in the body relative to the top edge.

17. The tray table indicator of claim 15, the channel including a fillet between the first extension and the second extension.

18. The tray table indicator of claim 15, the curve extending only between the first extension and the second extension.

19. The tray table indicator of claim 18, a length of the first extension being greater than a length of the second extension, and the first extension and the second extension being substantially parallel, such that the channel has a J-shape.

* * * * *